United States Patent [19]

Burns

[11] Patent Number: 5,692,629
[45] Date of Patent: Dec. 2, 1997

[54] MOLDED CLOSURE FOR A LIQUID CONTAINER HAVING PRINTING THEREON

[75] Inventor: Dennis L. Burns, Kent, Wash.

[73] Assignee: Supreme Corq, Kent, Wash.

[21] Appl. No.: 671,807

[22] Filed: Jun. 25, 1996

Related U.S. Application Data

[63] Continuation of Ser. No. 514,774, Aug. 14, 1995, which is a continuation of Ser. No. 238,170, May 4, 1994, Pat. No. 5,480,915, which is a continuation-in-part of Ser. No. 58,914, May 5, 1993, Pat. No. 5,496,862.

[51] Int. Cl.$^6$ ........................................................ B65D 7/28
[52] U.S. Cl. .......................... 215/200; 53/285; 101/2; 101/3.1; 215/355; 220/306; 220/352; 220/353; 521/73; 521/76; 521/79
[58] Field of Search ........................ 53/285; 101/2, 101/3.1; 215/200, 355; 220/306, 352, 353; 521/73, 76, 79

[56] References Cited

U.S. PATENT DOCUMENTS

| | | | |
|---|---|---|---|
| 311,834 | 2/1885 | Hoyt | 524/16 |
| 2,463,952 | 3/1949 | Cooke | 524/16 |
| 2,549,404 | 4/1951 | Williams | 215/364 |
| 3,406,127 | 10/1968 | Alexander | 521/43.5 |
| 3,549,472 | 12/1970 | King | 428/243 |
| 3,589,280 | 6/1971 | Wilde | 101/35 |
| 3,900,124 | 8/1975 | Marcel | 215/291 |
| 3,984,022 | 10/1976 | Babiol | 215/355 |
| 4,042,543 | 8/1977 | Strickman et al. | 524/16 |
| 4,081,720 | 3/1978 | Pfefferkorn et al. | 215/354 |
| 4,188,457 | 2/1980 | Throp | 521/51 |
| 4,259,901 | 4/1981 | Kidd | 101/452 |
| 4,285,186 | 8/1981 | Desom | 53/64 |
| 4,363,416 | 12/1982 | Loughmiller | 215/364 |
| 4,363,849 | 12/1982 | Paisley et al. | 428/318.8 |
| 4,373,437 | 2/1983 | Rodenbaugh et al. | 101/35 |
| 4,499,141 | 2/1985 | Paisley et al. | 428/318.8 |
| 4,507,405 | 3/1985 | Paisley et al. | 521/84.1 |
| 4,522,856 | 6/1985 | Paisley et al. | 428/64 |
| 4,544,677 | 10/1985 | Allen et al. | 521/92 |
| 4,695,594 | 9/1987 | Pressman | 521/92 |
| 4,756,436 | 7/1988 | Morita et al. | 215/228 |
| 4,847,150 | 7/1989 | Takeda | 428/318.8 |
| 4,882,378 | 11/1989 | Himes | 524/505 |
| 5,317,047 | 5/1994 | Sabate et al. | 524/16 |

FOREIGN PATENT DOCUMENTS

| | | | |
|---|---|---|---|
| 250 057 A2 | 12/1987 | European Pat. Off. | |
| 156 957 B1 | 10/1990 | European Pat. Off. | B65D 39/00 |
| 4-38775 B2 | 6/1992 | Japan | C08J 9/04 |
| 5-85555 | 4/1993 | Japan | B65D 39/04 |
| WO 87/07903 | 12/1987 | WIPO | C08L 23/02 |
| WO 95/13883 | 5/1995 | WIPO | B05D 3/08 |

OTHER PUBLICATIONS

Noshay and McGrath, *Block Copolymers: Overview and Critical Survey*, Academic Press, New York, 1977.

Shell Chemical Co., *Kraton Thermoplastic Rubber: Processing and Fabricating Kraton Thermoplastic Rubber Compounds*, Shell Chemical Co. Sales Offices, Illinois, Feb. 1993.

*Primary Examiner*—Terressa Mosley
*Attorney, Agent, or Firm*—Seed and Berry LLP

[57] ABSTRACT

A molded closure for a liquid container comprising a thermoplastic elastomer and a blowing agent. The molded closure is particularly suitable for use as a synthetic wine cork in a wine bottle. The molded closure does not permit passage of oxygen into the container, does not absorb oxygen from the contents of the container, can be removed from the container using a corkscrew without significant expansion, crumbling or disintegration, does not significantly taint a liquid in the container, permits the container to be placed horizontally immediately after insertion of the molded closure, and can permanently retain printed matter on its surface.

9 Claims, 1 Drawing Sheet

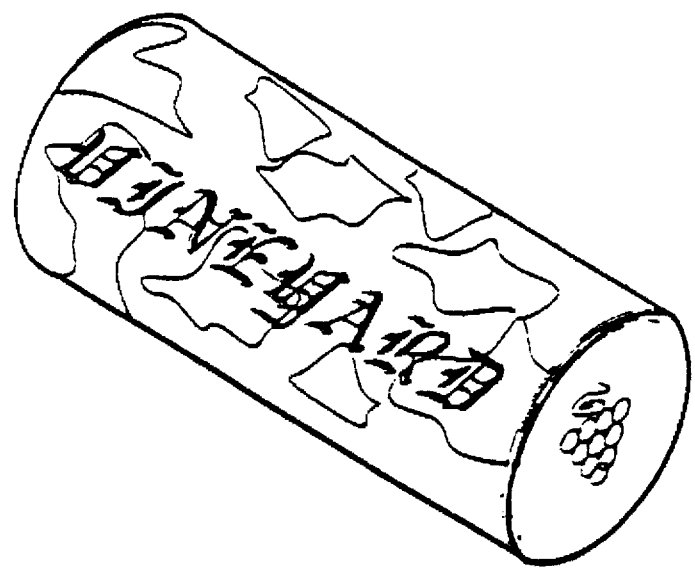

MOLDED CLOSURE FOR A LIQUID CONTAINER HAVING PRINTING THEREON

CROSS-REFERENCE TO RELATED APPLICATIONS

This application is a continuation of U.S. patent application No. 08/514,774, filed Aug. 14, 1995, which application is a continuation of U.S. patent application No. 08/238,170, filed May 4, 1994 now U.S. Pat. No. 5,480,915, which application is a continuation of U.S. patent application No. 08/058,914, filed May 5, 1993 now U.S. Pat. No. 5,496,862.

TECHNICAL FIELD

The present invention relates to molded closures for liquid containers and to compositions and methods for making such closures. In one aspect, the present invention relates to a composition for producing molded stoppers for bottles, particularly wine bottles, from a thermoplastic elastomer mixed with a blowing agent, and products from such a composition. In other aspects, the invention relates to a method for making molded closures such as wine bottle corks and a method of making a stoppered wine bottle.

BACKGROUND OF THE INVENTION

The most commonly used material for making stopper-type bottle closures is natural cork. There are, however, Significant disadvantages to using cork in the manufacture and marketing of bottle closures. Cork has variable properties with respect to color, drying, shrinkage or expansion, crumbling, sticking to containers and seal formation. These features are generally unsatisfactory in terms of production and consumer costs as well as product performance. In the case of wine closures, cork may also impart an odor to the product, causing it to be rejected by consumers. In addition, nearly 10% of bottled wine is discarded because of unpredictable contamination by mold from natural cork. Further, the use of cork for producing bottle closures is becoming increasingly expensive as the supply of trees from which cork is obtained rapidly diminishes.

Numerous attempts have been made to develop alternatives to natural cork bottle stoppers. Among these, screw top closures for wine containers have been found largely unsuitable because they do not provide the appearance, ceremony or romance that surrounds traditional cork wine closures. A number of synthetic cork closures have also been developed. In particular, recent efforts to develop closures from injection molded foam thermoplastics have encountered numerous pitfalls, particularly in terms of production costs, product performance, and consumer acceptance. Some of these closures have exhibited a tendency to noticeably taint the product and/or offer low resistance to oxygen permeation into the container. In addition, synthetic closures from foam thermoplastics have generally exhibited poor uniformity in terms of size, shape, weight, and other features important to production, marketing and performance.

In a particular case of injection molding of foam thermoplastic closures for liquid containers, thermoplastic compositions are injected into relatively cool molds, leading to the formation of a dense outer "skin" at the surface of the closure and a porous, foam-like interior. The composition of the closure and the structural relationship between the outer skin and porous core of the closure may be critical to the sealing capabilities of the finished closure. Other foam thermoplastic closures have suffered problems due to wrinkling of the outer skin layer, which can produce leakage fissures between the closure and container. Other prior art closures have different sealing problems, for example, failing to quickly return to normal size after compression, such that reliable seal formation requires containers to be kept ha an upright position for an extended period after insertion of the closure. Further, prior art closures are unable to significantly retain printed matter for a significant period of time.

U.S. Pat. No. 4,363,849 discloses the production of thermoplastic closures having a natural cork-like appearance. Special molding apparatus are used, however, and it is necessary to gradually release the air in the cold molding cavity that is displaced by the injected thermoplastic resinous material by means of controlled minimum venting or other means in order to maintain a heightened pressure, for example about 16,000 psi, within the mold. U.S. Pat. No. 4,188,457 discloses a thermoplastic composition that is also used to form closures for wine bottles. The thermoplastic composition includes sulfur dioxide and water, and the sulfur dioxide is said to act as an oxygen scavenger. This method is undesirable, however, because the sulfur dioxide or the metabisulphite from which it is produced may taint the liquid in the closure.

OBJECTS AND SUMMARY OF THE INVENTION

A general object of the present invention is to provide a molded closure for liquid containers comprising a thermoplastic elastomer ("TPE") and a blowing agent that, when fined into a liquid container, offers high resistance to oxygen permeation and produces little or no product tainting. The molded closure can also be produced for non-liquid containers.

Another object of the present invention is to provide a composition that can be readily fabricated into suitable closures for liquid containers, for example, wine bottles.

A further object of the present invention is to provide a composition for manufacturing closures for liquid containers that have essentially all of the desirable qualifies of natural cork, but preferably none of the undesirable features.

Yet another object of the present invention is to provide processes for injection molding closures for liquid containers.

Still another object of the present invention is to provide a novel composition and process for fabricating a closure that reliably seals liquid containers immediately upon insertion, and/or that is able to retain printed matter.

The molded closure of the present invention is preferably molded in the shape of a cork sized to fit a wine bottle. It has substantial uniformity of size, shape and weight and is aesthetically pleasing. Its appearance is distinctive from the look of natural cork by virtue of the present invention's artificial coloring, marbled surface texture, and ability to have a symbol embossed on its surface, preferably at one or both of its ends. In addition, the closure may be readily inserted into liquid containers using standard bottling equipment, and is easily removed using a traditional corkscrew without sticking crumbling or subsequent expansion. Because the molded closure of the invention does not expand upon removal, it may be re-inserted into the liquid container, thereby reclosing the container when it is not fully emptied. The molded closure may also be contacted with liquid contents in the container immediately after insertion, thereby removing the need for a waiting period to allow for formation of a proper seal between the molded closure and the container before the container is placed horizontally. The molded closure can also permanently retain printed matter.

These and other aspects of the present invention will become evident upon reference to the following detailed description and attached drawing.

BRIEF DESCRIPTION OF THE DRAWING

FIG. 1 depicts a molded closure suitable for a wine bottle, the molded closure evidencing a marbled surface texture, an embossed symbol on an end, printing on its side, and a radius at its edge.

DETAILED DESCRIPTION OF THE INVENTION

In one aspect of the present invention, there is provided a molded closure for liquid containers that can function as a suitable replacement for natural cork, wherein it is possible to control the size, shape, surface texture, surface lubricity, resilience, elasticity, density distribution, and aesthetic appearance of the molded closure.

Accordingly, the present invention features a molded closure for a liquid container, preferably a wine bottle, comprising a TPE and a blowing agent in a ratio suitable to provide a molded closure able to close a bottle of wine, thereby preventing spillage, and able to prevent passage of oxygen from the atmosphere to the wine, while simultaneously not substantially absorbing oxygen from the wine or the air space within the wine bottle between the molded closure and the wine. The molded closure has the ability to be removed with a corkscrew without substantial expansion, crumbling or disintegration (such expansion, crumbling or disintegration either causes the wine to become generally unpalatable and/or render the molded closure unusable).

It is possible to print on the molded closure, including on the surface of the molded closure that contacts the container, and the container can be placed on its side immediately after the molded closure is inserted into the container. The molded closure also has the ability to be used over an extended period (suitable for the wine to properly age to reach an appropriate drinkability, which can be about two years or more), and the ability to resist solvation in alcohol, acid or base, thereby keeping the wine free from tainting. Preferably, the molded closure further comprises one or more of a lubricant, a coloring agent, a filler, or other additives that can improve the performance and/or producibility of the closures. The molded closure does not, for example, include an oxygen scavenger, such as sulfur dioxide, which has been used in the past to increase the impermeability of synthetic corks, but which can taint the wine.

In another aspect of the invention, the molded closure is formed from a composition comprising one or more TPEs and one or more blowing agents. The durometer measurement of the molded closure, which is effectively an indirect measure of the hardness of the TPE used to make the molded closure, is generally from about 65A to about 90A, typically from about 70A to about 85A, and preferably from about 71A or 75A to about 80A. The TPE generally comprises from about 70% to about 97% of the composition, typically from about 80% to about 95%, and preferably from about 90% to about 95% of the composition (unless otherwise noted, all percentages herein are by volume). The TPE exhibits little or no interaction with, or tainting of; liquids such as wine. The TPE also has a suitable force of compression for improved sealability and long service life. The TPE is easily processed, enabling fast cycle times and high production rates. Further, selected TPEs meet FDA requirements for indirect food additives intended to come in contact with food.

In a preferred embodiment, the TPE comprises a styrenic block copolymer, and further preferably comprises one or more of a styrene-ethylene-butylene-styrene copolymer ("SEBS"), a styrene-ethylene-butylene copolymer, a styrene-butadiene-styrene copolymer, a styrene-butadiene copolymer, a styrene-isoprene-styrene copolymer, a styrene-isoprene copolymer, a styrene-ethylene-propylene-styrene copolymer, and a styrene-ethylene-propylene copolymer. The inclusion of a styrenic block copolymer, and particularly SEBS, is especially advantageous in the molded closure (especially when the molded closure is a wine cork) because such copolymers provide superior properties to the molded closure when compared to other TPEs. Many of these copolymers are available under the tradename KRATON®. In a still further preferred embodiment, the styrenic block copolymer is SEBS. Examples of such SEBS copolymers include J-VON®, DYNAFLEX GS6771-000 AND DYNAFLEX GX6768-1000, which possess desirable ozone and heat resistance for a long service life. In addition, such SEBS copolymers are resistant to water, bases, acids, and alcohol. J-VON® is commercially available from J. Von Ltd. Partnership, Leominster, Mass.; DYNAFLEX GS6771-000 and GX6768-1000 are available from CC&P, Portland, Oreg.

The blowing agent generally comprises greater than 1% of the composition, and typically comprises a range that includes at least about 1.3%, 1.5% or 2.0% of the composition, and less than about 9.0%, 5.0%, 4.0% or 3.0% of the composition. Preferably, the blowing agent comprises from about 1.3% to about 3% of the composition, typically from about 1.5% to about 2.5%, and preferably about 2% of the composition. The precise amount of blowing agent used may be determined by one skilled in the art of taking into account the precise polymer, blowing agent, and other ingredients used, as well as the molding conditions. The use of too much blowing agent will generally result in a molded closure that has excessively large cells in its interior, thus causing the molded closure to be overly spongy and potentially inconsistent during production. The use of too little blowing agent will generally result in a molded closure that does not have enough cells or inadequately sized cells. Such a molded closure can be too hard for routine removal using a corkscrew, among other problems.

In a preferred embodiment, the blowing agent is Spectratech FM1150H, which is commercially available from Quantum Chemical Corp., USI Division, Cincinnati, Ohio. Spectratech™ FM1150H is a polyolefin-based compound consisting of a low-density polyethylene based endothermic foam concentrate, comprising 50% of resin of the formula $CH_3—(CH_2)_n—CH_3$ and 50% of a combination of sodium bicarbonate ($NaHCO_3$) and citric acid. The beneficial qualities of Spectratech™ FM1150H include rapid degassing improved cycle times, improved density distribution, and superior surfaces for molded articles. Other suitable blowing agents such as azodicarbonamide, ozodecarbonoxide, and sodium bicarbonate also may be used. Still other blowing agents may be used without departing from the spirit and scope of the present invention.

In another embodiment, one or more fillers may be used in combination with the TPE and other added materials. For example, the filler may comprise calcium carbonate. If such a filler is used, it comprises up to about 20% or more of the composition, but preferably up to about 5% of the composition. Using such a filler can economize material expenditures. Other filler materials are apparent to those skilled in the art.

In another embodiment of the present invention, powder or liquid pigments are added to the mixture of TPE and other materials. The powder or liquid pigments generally comprise less than about 1% of the total composition. Preferably, the pigment is pre-blended with a thermoplastic resinous material such as polypropylene, and/or a portion of the TPE, before its addition to the main feedstock of TPE and other materials.

In a preferred embodiment, the composition comprises about 96% TPE, about 2% blowing agent, about 2% low density polypropylene, and a minor percentage of a desired pigment. In a further preferred embodiment, the pigment, the polypropylene and about 2% of the TPE are pre-blended, then introduced as a homogeneous mixture to the remaining TPE and blowing agent. In an alternative preferred embodiment, wherein the composition further comprises a filler, the composition comprises from about 75% to about 95% TPE, from about 1.5% to about 2.5% blowing agent, and up to about 20% filler.

In yet another preferred embodiment, a lubricant such as a fatty acid, a silicone, alcohol or water (including mineral water) is added before or after the molding, which may ease insertion of the molded closure into a container. Preferably, the lubricant is a fatty acid, and comprises less than about 0:5% of the total composition.

In another aspect, the present invention provides a molded closure that has a rounded edge, or radius, which is preferably convex. Preferably, the radius is on both edges (i.e., the top and bottom) of the closure. This aspect of the invention is preferably used with molded closures comprising a TPE, but is also suitable for use with molded closures produced from traditional thermoplastic resins that are not TPEs. Such a radius allows easier and more effective insertion of hte modled closure into a container (particularly a wine bottle), allows the molded closure to maintain a more uniform exterior surface when the molded closure is placed within a container, and is believed to assist in the ability of the molded closure to permit a container to be placed on its side substantially immediately after insertion of the molded closure.

It is a feature of the present invention that the molded closure can permanently retain printed matter on the surface of the molded closure that contacts the container. The surface of a molded closure is typically very slick and therefore unable to effectively receive or to retain such printed matter. In order to retain the printed matter, the compound is preferably a TPE, preferably a styrene block copolymer, and further preferably an SEBS copolymer, although a thermoplastic resin may also be used for this embodiment of the invention. Further, the molded closure, subsequent to molding is preferably subjected to a treatment to prepare the surface for printing. The treatment comprises subjecting the molded closure to high intensity electromagnetic radiation, and preferably in the visible light range or near the visible light range (e.g., U.V. light). One example of such a treatment is known as a corona pre-treatment, which is a standard treatment in the printing industry. The treatment is preferably performed prior to printing, but can be performed after printing.

It is yet another feature of the present invention that a container, such as a wine bottle, can be placed horizontally generally within about 4 hours, typically within about 1 hour, and preferably substantially immediately after receiving a molded closure produced according to the present invention. It is believed that this property of the molded closure is attained because the inventive composition permits the molded closure to achieve an interior cell size that causes the molded closure to return to at least about 90% of its original diameter within about 4 to about 5 seconds after being released from a compressed state. It is also believed that the inclusion of a radius edge on the molded closure aids this property of the molded closure.

Accordingly, after the molded closure is compressed and inserted into the container, the molded closure returns to approximately its normal size within from about 4 to about 5 seconds, thereby allowing the container to be immediately placed horizontally without spilling the contents of the container and without interfering with the seal between the molded closure and the container. For example, when the container is a wine bottle, it does not need a standing period before being racked.

In still another embodiment of the present invention, one or more other materials may also be added to the overall composition, including chemical blowing agent activators and other additives that can improve the producibility and/or performance of the closures. For example, if desired, a material can be added that can enhance the aroma and/or flavor of the liquid in the container.

It is a further feature of the present invention that the molded closure may be created using standard injection molding procedures.

In one example of the molding process, the bulk of the materials of the composition are thoroughly mixed to provide a uniform feedstock. The feedstock is next processed to be suitable for injection into an injection mold. In another vessel, pigment, polypropylene and a small portion of the TPE (preferably SEBS compound) are mixed to homogeneity. The prepared feedstock and the pigment bearing mixture are then injected into the mold, generally over a period of from about 0.02 to about 6 seconds, typically from about 0.03 to about 2 seconds, and preferably from about 0.04 to 1 second. The mold has a desired shape, which preferably is the shape of a wine cork. The molding pressure is generally from about 200 psi to about 900 psi, typically from about 300 psi to about 800 psi, and preferably from about 400 psi to about 700 psi. The molding temperature is generally from about 300° F. to about 550° F., typically from about 325° F. to about 425° F., and preferably from about 350° F. to about 400° F., and further preferably about 375° F. The mixture is generally maintained in the mold from about 20 seconds to about 90 seconds, typically from about 30 seconds to about 80 seconds, and preferably from about 35 seconds to about 60 seconds. Further preferably, the molding is performed as quickly as possible. Further, no special venting is required.

In a preferred embodiment, the composition is injected into the mold at a rate and temperature such that the softened or molten composition randomly coils about in the mold, much like a string being lowered into a bottle, to produce visible random curling along the surface of the molded closure, as depicted in FIG. 1. In an alternative embodiment, the composition is injected at a rate and temperature such that random curling is avoided.

Further, the air in the mold at the beginning of a mold cycle is preferably removed from the mold by means of a vacuum assist coordinated with the injection of the composition. The vacuum assist can be applied for about the last second of the injection period, or it may be first applied after the end of the injection period. Applying the vacuum assist too early in the injection period may result in overly large cell spaces within the molded closure, yielding an overly spongy product. Failure to use a vacuum assist may result in increased cycle times.

After a time period sufficient for the overall composition to effectively harden within the mold, the mold is opened and the molded closure is removed.

Molding times, pressures, venting, cooling, vacuum assisting, product removal, and other factors relevant to injection molding will be based upon the precise combination of materials included in the overall composition, the type, size and shape of the mold, and other factors apparent to those having ordinary skill in the art.

It is a feature of the present invention that the mold, preferably at one or both ends, can have embossed thereon a desired symbol, such as a crest of a wine cellar or lettering, and that such embossed symbol will be imparted to the cork.

The present embodiments of this invention are to be considered in all respects as illustrative and not restrictive, the scope of the invention being indicated by the appended claims, and all changes that come within the meaning and range of equivalency of the claims therefore are intended to be embraced therein.

What is claimed is:

1. A method of making a permanently printed molded closure comprising:

(a) combining a thermoplastic resin comprising a styrene block copolymer and a blowing agent into a mixture suitable for injection into an injection mold;

(c) maintaining said mixture in said injection mold until said mixture effectively hardens to form a molded closure;

(d) removing said molded closure from said injection mold;

(e) subjecting said molded closure to a treatment comprising high intensity electromagnetic radiation; and (f) introducing printed matter onto a surface of said molded closure to form said permanently printed molded closure.

2. The method of claim 1 wherein said thermoplastic elastomer comprises one or more of a styrene-ethylene-butylene-styrene copolymer, a styrene-butadiene-styrene copolymer, a styrene-isoprene-styrene copolymer.

3. The method of claim 1 wherein said thermoplastic elastomer comprises a styrene-ethylene-butylene-styrene copolymer.

4. The method of claim 1 wherein said blowing agent comprises about 1.5% to about 2.5% of said mixture.

5. The method of claim 1 or 3 further comprising, in coordination with the injection of said mixture into said injection mold, the removal of air from said mold by application of a vacuum assist.

6. The method of claim 5 wherein said vacuum assist is first applied after said mixture has been entirely injected into said injection mold.

7. The method of claim 5 wherein said vacuum assist is first applied during the last second of a period during which said mixture is injected into said injection mold.

8. The method of claim 1 or 3 wherein said high intensity electromagnetic radiation comprises near visible and visible light wavelengths.

9. The method of claim 1 wherein said treatment is performed prior to introducing said printed matter onto said surface of said molded closure.

* * * * *